United States Patent [19]

Ueno et al.

[11] Patent Number: 5,506,630
[45] Date of Patent: Apr. 9, 1996

[54] PROGRESSIVE MULTIFOCAL LENS

[75] Inventors: Yasunori Ueno, Kawasaki; Toshiaki Umeda, Tokyo; Fumio Takahashi, Ibaraki, all of Japan

[73] Assignee: Nikon Corporation, Tokyo, Japan

[21] Appl. No.: 249,980

[22] Filed: May 27, 1994

[30] Foreign Application Priority Data

May 31, 1993 [JP] Japan .................................. 5-149730

[51] Int. Cl.⁶ .................................................. G02C 7/06
[52] U.S. Cl. .................................................. 351/169
[58] Field of Search .................................. 351/168, 169, 351/170, 171, 172

[56] References Cited

U.S. PATENT DOCUMENTS

| 5,000,559 | 3/1991 | Takahashi et al. | 351/169 |
| 5,048,945 | 9/1991 | Ueno et al. | 351/169 |
| 5,272,495 | 12/1993 | Padrono | 351/169 |

FOREIGN PATENT DOCUMENTS

| 0408067 | 1/1991 | European Pat. Off. . |
| 2533708 | 3/1984 | France . |
| 52-110646 | 9/1977 | Japan . |
| 56-78817 | 6/1981 | Japan . |
| 59-58415 | 4/1984 | Japan . |
| 1-221722 | 9/1989 | Japan . |

OTHER PUBLICATIONS

Guilino, "Design Philosophy For Progressive Addition Lenses," *Applied Optics*, vol. 32, No. 1, Jan. 1, 1993, pp. 111–117.

*Primary Examiner*—Scott J. Sugarman
*Attorney, Agent, or Firm*—Shapiro and Shapiro

[57] ABSTRACT

In a progressive multifocal lens of the present invention, the values of a curvature ρm of a refracting surface along the principal meridional curve and a curvature ρs of the refracting surface in a direction perpendicular to the principal meridional curve become maximum at approximately the center of a nearsight portion on the principal meridional curve, decrease toward the peripheral region of the nearsight portion along the principal meridional curve, are substantially different from each other at least from the lower portion of a farsight portion to approximately the center of a intermediate portion, are substantially equivalent from approximately the center of the intermediate portion to the lower portion of the intermediate portion, and are substantially different from each other from the lowest portion of the intermediate portion and the nearsight portion.

7 Claims, 4 Drawing Sheets

PROGRESSIVE MULTIFOCAL LENS

BACKGROUND OF THE INVENTION

1. Field of the Invention

The present invention relates to a progressive multifocal lens used to assist an accommodation power of an eye.

2. Related Background Art

As spectacle lenses for assisting an accommodation power when an accommodation power of an eye becomes too weak to see a near point, various progressive multifocal lenses have been known. A progressive multifocal lens of this type has a "farsight portion", a "nearsight portion" and a progressive region (referred to as an "intermediate portion" hereinafter) which is located between the above two portions in which a refracting power is continuously changed. When the progressive multifocal lens is actually worn as spectacles by a user, the farsight portion becomes an upper portion while the nearsight portion becomes a lower portion. In the present invention, it is to be noted that "upper portion", "lower portion", "horizontal" and "vertical" are used to point positions of the progressive multifocal lens in the state that it is actually worn by the user. For example, the lower portion of the farsight portion is a position within the farsight portion close to the intermediate portion. Also, the difference between the nearsight refracting power and the farsight refracting power is called an additional power.

In a progressive multifocal lens of this type, in general, when wide distinct vision areas (ranges with an astigmatic difference of 0.5 diopter or less) of the farsight and nearsight portions are kept and coupled by the progressive power range, lens aberrations are concentrated on side portions of the progressive power range. As a result, blurring and distortion of an image occur in these side portions. Therefore, when a user wears spectacles formed of these multifocal lenses and shifts his eyes laterally, he perceives the distortion of an image as the fluctuation of the image and has an unpleasant feeling.

In order to prevent such a problem of visual characteristics, in known progressive power lenses, various designs and evaluations have been made from a variety of viewpoints. As for the shape of a lens surface, an intersecting line (principal meridional curve) defined by a section extending along a vertical meridian vertically passing through substantially the center of a lens surface and an object-side lens surface is used as a reference line for expressing specifications such as an additional power of a lens, and is also used as an important reference line in a lens design.

Figure 1:
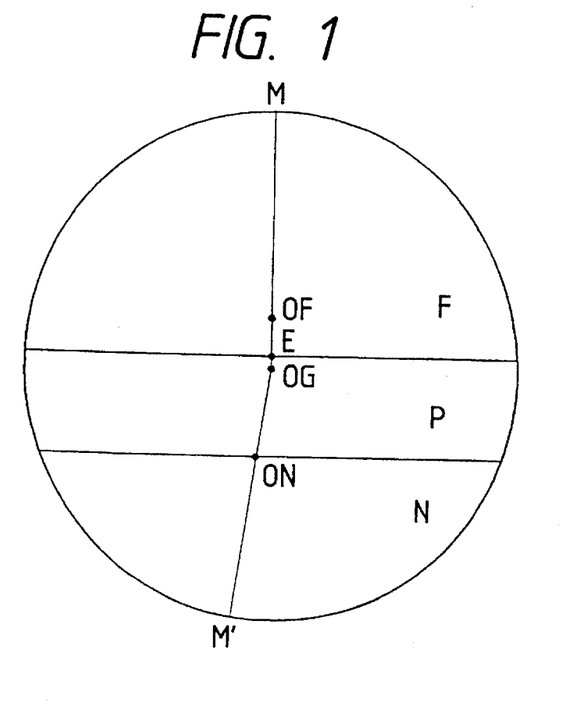
FIG. 1 is a plan view showing divisions of regions of an asymmetrical progressive multifocal lens according to an embodiment of the present invention.

As shown in FIG. 1, a progressive multifocal lens has been proposed in which an intermediate portion P and a nearsight portion N are asymmetrically arranged in consideration of the fact that a nearsight eye point (not shown) of the nearsight portion N is slightly displaced from the center toward a nasal side when the lens is worn (hereinafter referred to as an asymmetrical progressive multifocal lens).

Also, in such an asymmetrical progressive multifocal lens, a center line MM' consisting of an intersecting line of an object-side lens surface and a section passing the center OF of a farsight portion F, a farsight eye point E and the center of the nearsight portion N is used as a reference line. These reference line will be referred to as "principal meridional curves" in the present invention.

As conventional progressive multifocal lenses, there are a type in which a lens surface is formed by microscopic spherical surfaces connected continuously along a principal meridional curve over its entire line, i.e., formed by a so-called umbilical point curve and a type in which a refracting surface is formed such that the curvature $\rho m$ along the principal meridional curve and the curvature $\rho s$ in the direction perpendicular to the principal meridional curve are substantially different from each other on a portion of the principal meridional curve.

Namely, regarding the surface shape on the principal meridional curve, conventional progressive multifocal lenses can be classified roughly into a type in which the curvature $\rho m$ along the principal meridional curve and the curvature $\rho s$ in the direction perpendicular to the principal meridional curve are approximately equivalent over the entire line of the principal meridional curve to be an umbilical point form and a type in which the curvature $\rho m$ along the principal meridional curve and the curvature $\rho s$ in the direction perpendicular to the principal meridional curve are substantially different from each other in at least a portion on the principal meridional curve. The present invention is applicable to both types of progressive multifocal lenses.

Minkwitz's law carried in Optica Acta (Volume 10, No. 3, July 1963) says that it is necessary not to make at least an intermediate portion along the principal meridional curve in the umbilical form. Namely, according to Minkwitz's law, it is said that when a lens surface is in the umbilical point form over the entire principal meridional curve, the astigmatic difference of a surface refracting power of a lens is increased at a rate of double the surface refracting power along an umbilical point, making it impossible to obtain a wide distinct vision area.

As a conventional progressive multifocal lens adopting the above-mentioned Minkwitz's law, e.g., there is a lens disclosed in Japanese Patent Application Laid-Open No. 52-110646. According to Minkwitz's law, this lens is structured such that the curvature $\rho m$ along the principal meridional curve and the curvature $\rho s$ in the direction perpendicular to the principal meridional curve are substantially different from each other in an intermediate portion on the principal meridional curve. That is, a difference is provided between two main curvatures perpendicular to each other. Thereby, a distinct vision area in the intermediate portion can be enlarged.

In a progressive multifocal lens disclosed in Japanese Patent Application Laid-Open No. 56-78817, the difference between the curvature $\rho m$ along the principal meridional curve and the curvature $\rho s$ in the direction perpendicular to the principal meridional curve is increased from a farsight porion to a nearsight portion and decreased in the nearsight portion. In the lower portion of the nearsight portion, two main curvatures become equivalent. Thereby, distortion of an image in the center of the nearsight portion can be reduced.

Also, in Japanese Patent Application Laid-Open No. 59-58415, a progressive multifocal lens wherein a portion on the principal meridional curve is not in the umbilical form is disclosed. In this lens, from a center of a farsight portion located in the lower portion of the farsight portion to a peripheral region of the lens (the upper end of the lens) and from a center of a nearsight portion located in the upper end of the nearsight portion to a peripheral region (the lower end of the lens), the curvature $\rho m$ along the principal meridional curve are gradually increased and the curvature $\rho s$ in the direction perpendicular to the principal meridional curve is kept constant. Thereby, distinct vision areas of the farsight and nearsight portions are enlarged and it is possible to make the lens thinner.

Further, in a progressive multifocal lens disclosed in Japanese Patent Application Laid-Open No. 1-221722, the value of the curvature ρm along the principal meridional curve and the value of the curvature ρs in the direction perpendicular to the principal meridional curve become maximum in approximately the upper portion of a nearsight portion and decrease toward the peripheral region of the nearsight portion along the principal meridional curve. The value of the main curvature ρm and the value of the main curvature ρs are substantially equivalent from at least the lower portion of a farsight portion to approximately the center of an intermediate portion and substantially different from each other in the nearsight portion. Therefore, a wide distinct vision area is obtained in the farsight portion and vision is improved from the intermediate portion to the nearsight portion. Further, in the side regions from the lower portion of the farsight portion to the nearsight portion where lens aberrations are liable to be concentrated, the aberration density can be decreased to reduce distortion and fluctuation of an image.

Thus, in the above-structured conventional progressive multifocal lenses, wider distinct vision areas can be obtained to a certain extent by adopting Minkwitz's low.

However, the lens in Japanese Patent Application Laid-Open No. 52-110646 is merely aiming at obtaining a wide distinct vision area of the intermediate portion, and the lens in Japanese Patent Application Laid-Open No. 56-78817 is chiefly aiming at obtaining a wide distinct vision area of the nearsight portion. Also, the lens in Japanese Patent Application Laid-Open No. 59-58415 is only aiming at obtaining wide distinct vision areas of the nearsight and farsight portions. Although the lens in Japanese Patent Application Laid-Open No. 1-221722 is aiming at obtaining wide distinct vision areas of the three portions to decrease the aberration density to reduce distortion and fluctuation of an image, it is not still sufficient to obtain a wider distinct vision area over three portions of the farsight, intermediate and nearsight portions and to improve visual characteristics of the respective portions in any of the above conventional lenses.

Especially, in conventional progressive multifocal lenses, as a visual line passing the principal meridional curve in an intermediate portion generally enters a lens surface not perpendicularly but obliquely, a surface astigmatic difference is produced if the area of the intermediate portion on the principal meridional curve has an umbilical-point-like surface.

Recently, there have been requirements for the more comfortable vision of the intermediate portion. Therefore, it is required to reduce lens aberrations in side regions of the intermediate portion to avoid distortion and fluctuation of an image in those regions. Therefore, there is a tendency to lengthen the intermediate portion (the refracting power progressively changing region) along the principal meridional curve. Also, a base curve on the entire lens surface tends to be shallow or gentle. Accordingly, the angle by the visual line and the refracting surface on the principal meridional curve in the intermediate portion, specifically the tilt angle by the visual line and the normal line of the refracting surface becomes much larger, which causes occurrence of a serious astigmatic difference.

Further, recently, in consideration of the fact that a nearsight portion comes close to a nasal side when a lens is worn, asymmetrical progressive multifocal lenses in which a nearsight portion is arranged asymmetrically have been developed. In such a lens, aberrations tend to concentrate on the nasal side as compared to a temporal side, so the user feels discomfort due to distortion and fluctuation of an image.

SUMMARY OF THE INVENTION

It is therefore an object of the present invention to provide an asymmetrical progressive multifocal lens wherein the aberration density in side regions of the principle meridional curve from the lower portion of a farsight portion to a nearsight portion, in particular, a nasal side region is alleviated.

In order to achieve the above object, in a progressive multifocal lens having, along a principal meridional curve, a farsight portion having a refracting power corresponding to a distant view, a nearsight portion having a refracting power corresponding to a near view and being arranged asymmetrically toward a nasal side, and an intermediate portion, located between the farsight and nearsight portions, for continuously connecting the refracting powers of the farsight and nearsight portions, the values of the curvature ρm of a refracting surface along the principal meridional curve and the curvature ρs of the refracting surface in a direction perpendicular to the principal meridional curve become maximum at approximately the center of the nearsight portion on the principal meridional curve, decrease toward a peripheral region of the nearsight portion along the principal meridional curve, are substantially different from each other at least from the lower portion of the farsight portion to approximately the center of the intermediate portion, are substantially equivalent from approximately the center of the intermediate portion to the lower portion of the intermediate portion, and are substantially different from each other from the lowest portion of the intermediate portion and the nearsight portion.

In a preferred embodiment of the present invention, the values of the curvature ρm and the curvature ρs are gradually decreased or increased from a center of the farsight portion to an upper portion of the farsight portion. Also, the average refracting power of surface refracting power along the principal meridional curve are gradually increased from the center of the farsight to a farsight eye point position and connected to an additional power curve of the intermediate portion continuously and smoothly.

As shown in FIG. 1, the object of the present invention is an asymmetrical progressive multifocal lens which has along a principal meridional curve MM', a farsight portion F having a refracting power corresponding to a distant view, a nearsight portion N having a refracting power corresponding to a near view, and an intermediate portion P, located between the farsight and nearsight portions, for continuously connecting the refracting powers of the farsight and nearsight portions, and in which the nearsight portion N is arranged asymmetrically in consideration of the fact that the nearsight portion comes close to a nasal side when the lens is worn.

In order to reduce distortion and fluctuation of an image by alleviating the aberration density in side regions of the principal meridional curve MM' (hereinafter referred to as the principal meridional curve simply) from the lower portion of the farsight portion F to the nearsight portion N, in particular, a side region of a nasal side, the values of the curvature ρm along the principal meridional curve and the curvature ρs in the direction perpendicular to the principal meridional curve are aimed at, i.e., two main curvatures of these are aimed at to find an optimum surface shape.

According to the optimum surface shape of the present invention, the values of two main curvatures ρm and ρs become maximum approximately at the center of the nearsight portion N on the principal meridional curve and decrease toward the peripheral region of the nearsight portion N along the principal meridional curve. Further, the two main curvatures ρm and ρs are substantially different from each other at least from the lower portion of the farsight portion to approximately the center of the intermediate portion, are substantially equivalent from approximately the center of the intermediate portion to the lower portion of the intermediate portion, and are substantially different from each other in the lowest portion of the intermediate portion and the nearsight portion.

Also, it is preferable to have the refracting surface shape such that the values of the curvature ρm and the curvature ρs are gradually decreased or increased from the center of the farsight portion to the upper portion of the farsight portion.

More specifically, in the farsight portion F, preferably, from the center OF of the farsight portion F to the upper portion of the farsight portion F, the value of the curvature ρm along the principal meridional curve is gradually decreased and then increased and the value of the curvature ρs in the direction perpendicular to the principal meridional curve is kept constant for a while and then decreased. Alternatively, depending on the selected curvature (refracting power) of the farsight portion F, from the center OF of the farsight portion F to the upper portion of the farsight portion F, the value of the curvature ρm along the principal meridional curve is gradually increased and then decreased and the value of the curvature ρs in the direction perpendicular to the principal meridional curve is kept constant for a while and then increased.

Also, the average refracting power of surface refracting power along the principal meridional curve are gradually increased from the center OF of the farsight portion to a farsight eye point E position and connected to an additional power curve of the intermediate portion P continuously and smoothly.

Further, from the center OF of the farsight portion F to the upper portion of the farsight portion F, the change of the average refracting power of surface refracting power preferably satisfies the following conditions (1) and (2):

$$0.03\ A \leq |\Delta D| \leq 0.3\ A \quad (1)$$

$$0.003\ A \leq |Dk| \leq 0.03\ A, \quad (2)$$

wherein

ΔD: the change amount (diopter) of the average refracting power of surface refracting power from the center of the farsight portion to the upper portion of the farsight portion along the principal meridional curve A: the additional power (diopter)

Dk: the gradient (diopter/mm) of the curve of the average refracting power of surface refracting power from the center of the farsight portion to the upper portion of the farsight portion along the principal meridional curve.

Further, in a position from the center OF of the farsight portion F to the farsight eye point E position, it is preferable to satisfy the following conditions (3) and (4):

$$0.025\ A \leq \Delta D \leq 0.25\ A \quad (3)$$

$$0.0025\ A \leq Dk \leq 0.025\ A, \quad (4)$$

wherein

ΔD: the change amount (diopter) of the average surface refracting power from the center of the farsight portion to the farsight eye point position along the principal meridional curve A: the additional power (diopter)

Dk: the gradient (diopter/mm) of the curve of the average refracting power of surface refracting power from the center of the farsight portion to the farsight eye point position along the principal meridional curve.

When exceeding the upper limits of the conditions (1) and (3), and astigmatic difference becomes large in side regions of the farsight portion F, making it impossible to obtain a wider distinct vision area. On the other hand, when falling below the lower limits of the conditions (1) and (3), the aberrations become considerably asymmetrical between the temporal side and the nasal side and in particular, the aberrations are larger in the side region of the nasal side.

Also, the conditions (2) and (4) should be satisfied to attain smooth continuity of the lens refracting surface.

In the case of a progressive multifocal lens designed symmetrically, in the range from the lower portion of the farsight portion F to approximately the center of the intermediate portion P on the principal meridional curve, the distance from the farsight eye point E position is small, so occurrence of aberrations is comparatively small. Therefore, even though the lens surface is approximately in the umbilical form, preferable visual characteristics can be obtained and it is advantageous to widen the distinct vision area of the farsight portion F.

However, in the case of the asymmetrical progressive multifocal lens of the present invention, the principal meridional curve MM' (refer to FIG. 1) from the lower portion of the farsight portion F to approximately the center of the intermediate portion P is close to an area where the lens surface starts to be asymmetrical, so if the design method for the conventional lens designed symmetrically is applied thereto, the astigmatic differences are concentrated on side regions of the portion from the lower portion of the farsight portion F to approximately the center of the intermediate portion P, in particular, the astigmatic difference of the side region of the nasal side becomes too large as compared to that of the temporal side. Therefore, distortion and fluctuation of an image are increased on the nasal side, causing the distinct vision areas of the farsight and intermediate portions F and P to be narrowed.

Then, in the present invention, in a predetermined additional power along the principal meridional curve from the lower portion of the farsight portion F to approximately the center of the intermediate portion P, a difference is provided between the curvature ρm along the principal meridional curve and the curvature ρs in the direction perpendicular to the principal meridional curve by being deviated from the umbilical point. As a result, the concentration of the astigmatic difference in the side regions from the lower portion of the farsight portion F to F to approximately the center of the intermediate portion P, in particular, the side region of the nasal side region is alleviated. Namely, the astigmatic difference of the nasal side region will not be concentrated as compared to that of the temporal the lowest portion of the intermediate portion P to the nearsight portion N and the aberration density in the side regions where aberrations are liable to be concentrated can be alleviated to reduce distortion and fluctuation of an image, making it possible to attain a wider distinct vision area.

Further, two main curvatures ρm and ρs are made substantially equivalent from approximately the center of the intermediate portion P to the lower portion of the intermediate portion P. Thereby, this portion can be connected to the upper portion of the intermediate portion P as well as to the nearsight portion N continuously and smoothly, enabling the preferable vision of the intermediate portion.

In the farsight portion F according to a preferred embodiment of the present invention, from the center OF of the farsight portion F to the upper portion of the farsight portion F, the value of the curvature ρm along the principal meridional curve is gradually decreased and then increased and the value of the curvature ρs in the direction perpendicular to the principal meridional curve is kept constant for a while and then decreased. Thereby, it is possible to connect the side regions of the farsight portion F and those of the intermediate portion P smoothly. As a result, the distinct vision area of the farsight portion F can be widened (especially, in the nasal side region where aberrations are liable to be concentrated) and it is possible to improve the visual characteristics in the side regions of the intermediate portion P.

In the farsight portion F according to another preferred embodiment of the present invention, depending on the selected curvature (refracting power) of the farsight portion F, from the center OF of the farsight portion F to the upper portion of the farsight portion F, the value of the curvature ρm along the principal meridional curve is gradually increased and then decreased and the value of the curvature ρs in the direction perpendicular to the principal meridional curve is kept constant for a while and then increased. Thereby, side region distortion and fluctuation of an image are reduced in the nasal side region. Also, reduction of both astigmatic differences of the nasal and temporal side regions is realized and distinct vision areas of the farsight and intermediate portions F and P can be enlarged.

The lowest portion of the intermediate portion P and the nearsight portion N are spaced apart from the area from which the principal meridional curve starts to be asymmetrical and then hardly receives the influence by its asymmetrical design. Therefore, two main curvatures ρm and ρs are substantially differentiated in there, the same as in Japanese Patent Application Laid-Open No. 1-221722. Thereby, the visual characteristics can be improved from the same effect as the above can be obtained.

In still another embodiment of the present invention, the average refracting power of surface refracting power on the principal meridional curve is gradually increased from the center OF of the farsight portion to the farsight eye point E position and connected to the additional power curve of the intermediate portion P continuously and smoothly. Thus, the farsight portion F and the intermediate portion P are connected smoothly, so that the preferable vision of the intermediate portion can be obtained.

As described above, according to the present invention, the farsight portion can have a properly wider distinct vision area and the intermediate and nearsight portions can also have sufficiently wider distinct vision areas for practical use. Also, the distortion and fluctuation of an image can be reduced in the side regions, in particular, the nasal side region. Thus, the optimum shape of the lens as well as the optimum aberration balance over the entire refracting surface can be realized.

In designing the lens surface of such a progressive multifocal lens, the design and evaluation are not limited to the range of the circular shape of the lens. Assuming a square including the circular shape of the lens surface, the design and evaluation were performed for the surface shape within the square. Thus, by optimizing the curve of the larger surface including the circular shape of the lens, it is possible to form a practical lens surface more smoothly and excellently.

Figure 6:
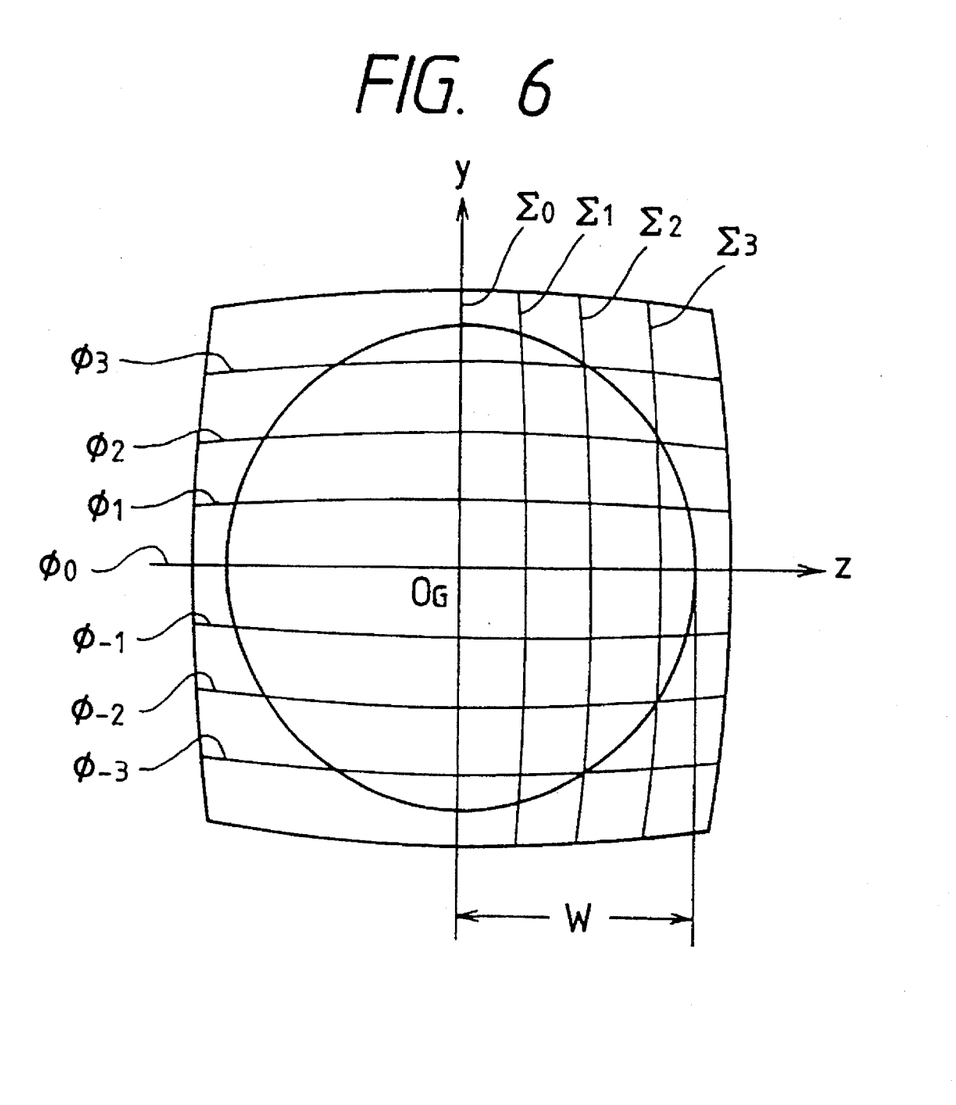
FIG. 6 is a diagram for explaining horizontal and vertical sections to be used as references in designing the progressive multifocal lens.

In FIG. 6, OG is a geometric center of the lens and W is the radius of the lens. Curves $\Phi_3$ to $\Phi_{-3}$ and curves $\Sigma_0$ to $\Sigma_3$ indicate horizontal and vertical sections respectively along Z- and Y-axes to be used as references in a lens design.

In general, as progressive multifocal lenses are worked to frames of spectacles, the respective areas of the farsight, intermediate and nearsight portions F, P and N, in particular, the areas of the farsight and nearsight portions F and N including the peripheral portion are changed largely due to the shape of the frame. Prior to work, progressive multifocal lenses are circular lenses having a diameter of 60 mm or more and supplied to spectacles shops as they are. In the spectacles shops, the lenses are worked in correspondence with desired spectacle frames.

Therefore, the prescription of the lens surface shape of the progressive multifocal lens of the present invention is determined based on the lens shape prior to processing. And, for designing the optimum surface shape of the multifocal lens, it is necessary to achieve optimum aberration balance by taking into consideration not only the surface shape of the central region to be used with high frequency but also that of the larger region including the effective region to be used.

DESCRIPTION OF THE PREFERRED EMBODIMENT

An embodiment of the present invention will be described below with reference to the accompanying drawings.

Figure 2:
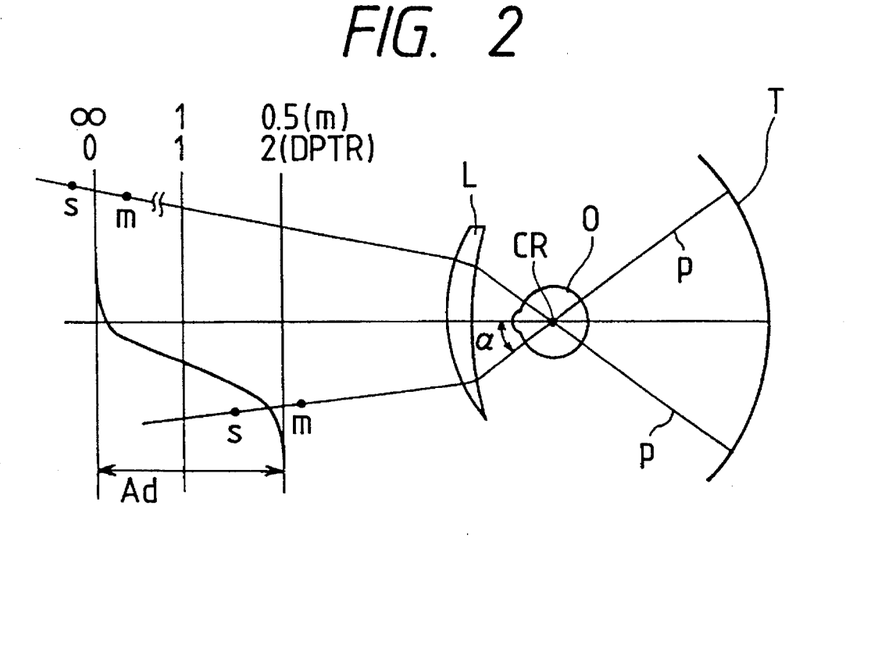
FIG. 2 is an explanatory diagram showing the state of an eye when the progressive multifocal lens is worn and the state of a vertical cross section of the lens along a principal meridional curve.

FIG. 2 is an explanatory diagram showing the state of an eye when the progressive multifocal lens is worn and the state of a vertical cross section of the lens along a principal meridional curve. As an eye-ball rotates around a center CR, a visual line P passes various points on the progressive multifocal lens L. When seeing a near object, a face is inclined downward and, simultaneously, the visual line p is lowered by an angle α. At this time, when the progressive multifocal lenses are worn as spectacles, visual lines of both eyes are, while being converged, each shifted from the intermediate portion P to the nearsight portion N along the meridional line of the lens L. Among portions of a retina sensing a vision, the portion where a visual acuity becomes best is the fovea of the macula. When seeing an object, it is necessary to form clear images in the fovea positions by directing eyes to the object such that the visual lines coincide with the fovea positions. An object-side conjugate position when the fovea position is not adjusted is called the far point of accommodation. The locus T of the far point of accommodation when the eye-ball is rotated is called the far point spherical surface.

FIG. 2 shows the state of the hyperopia eye. As the far point of accommodation of the hyperopia eye is located behind the eye-ball, the far point spherical surface T can be drawn around the center CR. Therefore, it is equivalent to the state that the fovea of the macula is located in a position of the far point spherical surface T.

Then, a ray p from the far point spherical surface passing the center CR and being directed to the progressive multifocal lens L is considered and a position where the ray p is converged after refracted by the lens L is an object position. At this time, when the position of an m-image (a meridional image) along the principal meridional curve coincides with the position of an s-image (a sagittal image) in the direction perpendicular to the principal meridional curve, the state of the image formation becomes preferable. However, in general, the m-image does not coincide with the s-image and an astigmatic difference is produced. When the degree of the astigmatic difference is large, an image is distorted, imparting uncomfortable feeling to the user.

A curve shown in FIG. 2 shows the change of the conjugate point with the far point spherical surface T and is a line formed by linking average positions of m-images and s-images. And, this curve corresponds to a so-called additional power curve of the progressive multifocal lens L. In FIG. 2, the refracting power of the farsight portion F is 0 diopter and the refracting power of the nearsight portion N is 2 diopter. Then, the additional power Ad is 2 diopter. The distance Δ between the m-image and the s-image corresponds to the astigmatic difference as an aberration in the state that the lens is worn.

Thus, by performing performance evaluation of the lens in the state that the lens is actually worn, it is possible to design the lens having optimum performance for practical use.

The center OF of the farsight portion F is a position on the principal meridional curve having a predetermined average surface refracting power in the farsight portion F and is made as a reference point for practically measuring the farsight portion F. The center ON of the nearsight portion N is a position on the principal meridional curve having a predetermined average surface refracting power in the nearsight portion N and is made as a reference point for practically measuring the nearsight portion N.

The farsight eye point E is made as a reference point when setting the lens in a frame of spectacles and coincides with a farsight visual line passing position when the spectacles are worn.

Figure 3:
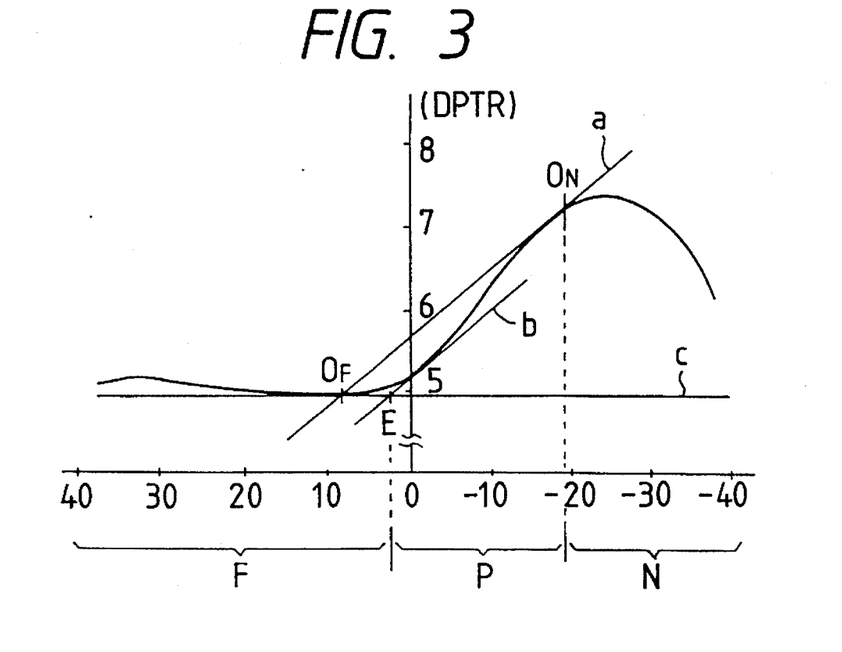
FIG. 3 is a graph showing an additional power curve of the progressive multifocal lens in which average refracting power of surface refracting power on the principal meridional curve is plotted at respective positions on the meridional curve.

As shown by the average refracting power distribution curve on the principal meridional curve in FIG. 3, the position of the farsight eye point E is determined independently of the geometric center of the lens and is defined in the present invention as follows. Namely, in the additional power curve shown in FIG. 3 by plotting average refracting power of surface refracting power on the principal meridional curve for respective positions on the principal meridional curve, a point E where a line b which is parallel to a line a connecting the center OF of the farsight portion F and the center ON of the nearsight portion N and contacts the additional power curve on the farsight portion F side intersects with a line c representing an average refracting power at the center OF of the farsight portion F is defined as a farsight eye point.

Figure 4:
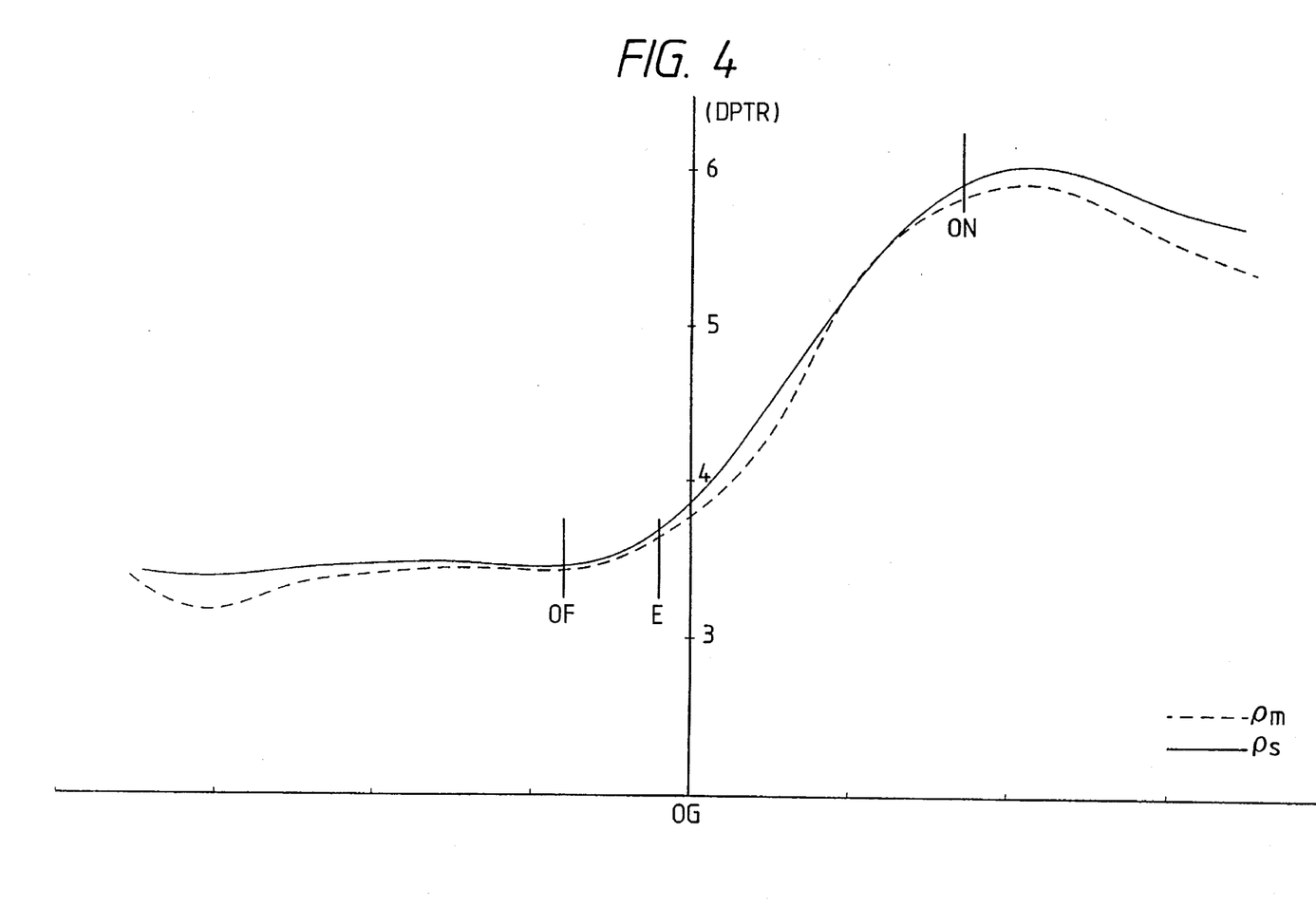
FIG. 4 is a graph showing a refracting power distribution curve of the progressive multifocal lens.

FIG. 4 is a refracting power distribution power curve of the progressive multifocal lens on the principal meridional curve according to the embodiment of the present invention.

In the progressive multifocal lens of this embodiment, the average refracting power (base curve) of the farsight portion F is 3.5 diopter and the additional power A is 2.5 diopter. Therefore, the refracting power at the center OF of the farsight portion F is 3.5 diopter and that at the center ON of the nearsight portion N is 6.0 diopter.

A refracting power distribution curve ρm in the direction along the principal meridional line as indicated by a broken line and a refracting power distribution curve ρs in the direction perpendicular to the principal meridional curve as indicated by a solid line both become maximum at approximately the center of the nearsight portion N on the principal meridional curve and decrease toward the peripheral region of the nearsight portion N along the principal meridional curve. The values of ρm and ρs are substantially different from each other from the lower portion of the farsight portion F to approximately the center of the intermediate portion P.

On the other hand, the values of ρm and ρs are substantially equal from approximately the center of the intermediate portion P to the lower portion of the intermediate portion P and are substantially different from each other from the lowest portion of the intermediate portion P to the nearsight portion N.

In the farsight portion F of the progressive multifocal lens of this embodiment, from the center OF of the farsight portion F to the upper portion of the farsight portion F, the value of the curvature ρm along the principal meridional curve is gradually decreased and then increased and the value of the curvature ρs in the direction perpendicular to the principal meridional curve is kept constant for a while and then decreased. Also, in the vicinity of the center OF of the farsight portion F, the value $\rho=|\rho m-\rho s|$ approaches Zero. In the progressive multifocal lens of the present invention, depending on the selected curvature (refracting power) of the farsight portion F, from the center OF of the farsight portion F to the upper portion of the farsight portion F, the value of the curvature ρm along the principal meridional curve is gradually increased and then decreased and the value of the curvature ρs in the direction perpendicular to the principal meridional curve is kept constant for a while and then increased.

Further, in the progressive multifocal lens of this embodiment, average refracting power of surface refracting power on the principal meridional curve are gradually increased from the center OF of the farsight portion to the farsight eye point E position and connected to the additional power curve of the intermediate portion P continuously and smoothly.

Also, in the progressive multifocal lens of this embodiment, in the farsight portion F, from the center OF of the farsight portion F to the upper portion of the farsight portion F, the increase amount ΔD (diopter) of the average refracting power of surface refracting power along the principal meridional curve and the gradient Dk (diopter/mm) of the average refracting power of surface refracting power along principal meridional curve are the following values:

ΔD=−0.35 (diopter)

Dk=−0.016 (diopter/mm).

Namely, with respect to the additional power A of 2.5 diopter, the following relationships hold:

|ΔD|=0.14 A

|Dk|=0.0064 A.

Further, in the progressive multifocal lens of this embodiment, from the center OF of the farsight portion F to the farsight eye point E position, the increase amount ΔD (diopter) of the average refracting power of surface refracting power along the principal meridional curve and the gradient Dk (diopter/mm) of the average refracting power of surface refracting power along the principal meridional curve are the following values:

ΔD=0.20 (diopter)

Dk=0.033 (diopter/mm).

Namely, with respect to the additional power A of 2.5 diopter, the following relationships hold:

|ΔD|=0.08 A

|Dk|=0.0132 A.

Figure 5:
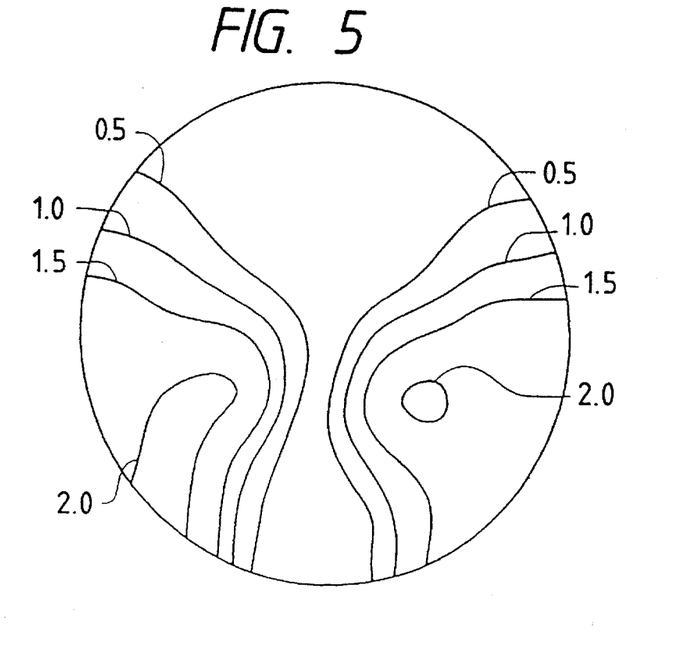
FIG. 5 is a graph showing astigmatic difference curves of the progressive multifocal lens.

FIG. 5 shows astigmatic difference curves of the progressive multifocal lens of this embodiment based on the result of the performance evaluation carried out according to the design method shown in FIG. 2. The astigmatic difference curves are plotted by 0.5 diopter.

As shown in FIG. 5, according to the present invention, the density and gradient of lines representing the astigmatic difference are reduced in the side regions between the farsight portion F and the intermediate portion P owing to the gentle power gradient from the center OF of the farsight portion F to the farsight eye point E. Also, the astigmatic difference is reduced in side regions of the farsight portion F by imparting the gentle refracting power of gradient to the upper portion of the farsight portion F. Further, the astigmatic difference of the nasal side region where the astigmatic difference is liable to be concentrated as compared to the temporal side region is reduced and the density and gradient of lines representing the astigmatic difference are reduced. Also, the density and gradient of the astigmatic difference are reduced in side regions of the nearsight portion N due to the power gradient by the decrease of the power in the lower portion of the nearsight portion N and the approximately constantly kept value ρ=|ρm−ρs| in a portion of the nearsight portion N in the vicinity of the center ON of the nearsight portion N.

Further, the main curvatures ρm and ρs are substantially different from each other from the lowest portion of the intermediate portion P to the nearsight portion N, so that the vision in these portions is improved and the aberration density in the side regions of these portions where the aberration is liable to be concentrated can be alleviated. As a result, the distortion and fluctuation of an image can be reduced, making it possible to obtain a larger distinct vision area.

Also, the main curvatures ρm and ρs are substantially equivalent from approximately the center of the intermediate portion P to the lower portion thereof. Therefore, the connection between this portion and the upper portion of the intermediate portion P and the connection between this portion and the upper portion of the nearsight portion N can be performed continuously and smoothly and preferable vision of the intermediate portion can be obtained.

Although it is difficult to completely explain and define the trend of the entire surface refracting power including the peripheral portion by the trend of the surface refracting power on the principal meridional curve, it is possible to keep the aberration balance preferable over the entire lens surface as well as to obtain excellent visual characteristics by the above-mentioned surface refracting power distribution on the principal meridional curve according to the present invention.

As described above, in the progressive multifocal lens of the present invention, by the gentle power gradient from the center of the farsight portion to the farsight eye point, the density and gradient of the lines representing the astigmatic difference in the side regions from the lower portion of the farsight portion to the intermediate portion are reduced. Also, by imparting the gentle power gradient to the upper portion of the farsight portion, the astigmatic difference in the side regions of the farsight portion can be reduced. Further, due to the power gradient by the power decrease of the lower portion of the nearsight portion, the density and gradient of the astigmatic difference in the side regions of the nearsight portion are reduced.

Therefore, in the progressive multifocal lens of the present invention, with a distinct vision area of the farsight portion kept sufficiently wide for practical use, the vision can be improved in the intermediate and nearsight portions and the aberration density in the side regions of the principal meridional curve from the lower portion of the farsight portion to the nearsight portion, in particular, the side region of the nasal side can be alleviated. As a result, it is possible to reduce the distortion and fluctuation of an image considerably and then, even a user who wears these lenses as spectacles for the first time does not feel uncomfortable.

What is claimed is:

1. A progressive multifocal lens comprising, along a principal meridional curve, a farsight portion having a refracting power corresponding to a distant view, a nearsight portion having a refracting power corresponding to a near view and being arranged asymmetrically toward a nasal side, and an intermediate portion, located between said farsight and nearsight portions, for continuously connecting the refracting powers of said farsight and nearsight portions and wherein the values of a curvature ρm of a refracting surface along the principal meridional curve and a curvature ρs of said refracting surface in a direction perpendicular to said principal meridional curve become maximum at approximately a center of said nearsight portion on said principal meridional curve, decrease toward a peripheral region of said nearsight portion along said principal meridional curve, are substantially different from each other at least a lower portion of said farsight portion to approximately a center of said intermediate portion, are substantially equivalent from approximately the center of said intermediate portion to a lower portion of said intermediate portion, and are substantially different from each other from a lowest portion of said intermediate portion to said nearsight portion.

2. A progressive multifocal lens according to claim 1, wherein the values of the curvature ρm and the curvature ρs are gradually decreased or increased from a center of said farsight portion to an upper portion of said farsight portion.

3. A progressive multifocal lens according to claim 2, wherein average refracting power of surface refracting power along the principal meridional curve is gradually increased from the center of said farsight portion to a farsight eye point position and connected to an additional power curve of said intermediate portion continuously and smoothly.

4. A progressive multifocal lens according to claim 2, wherein, from the center of said farsight portion to the upper portion of said farsight portion, the following conditions are satisfied:

0.03 A≦|ΔD|≦0.3 A 0.003 A≦|Dk|≦0.03 A, wherein

ΔD: a change amount (diopter) of average refracting power of surface refracting power from the center of said farsight portion to the upper portion of said farsight portion along said principal meridional curve A: an additional power (diopter)

Dk: a gradient (diopter/mm) of a curve of the average refracting power of surface refracting power from the center of said farsight portion to the upper portion of said farsight portion along said principal meridional curve.

5. A progressive multifocal lens according to claim 3, wherein, from the center of said farsight portion to said farsight eye point position, the following conditions are satisfied:

$$0.025\ A \leqq \Delta D \leqq 0.25\ A$$

$$0.0025\ A \leqq Dk \leqq 0.025\ A,$$

wherein

ΔD: a change amount (diopter) of the average refracting power of surface refracting power from the center of said farsight portion to said farsight eye point position along the principal meridional curve A: an additional power (diopter)

Dk: a gradient (diopter/mm) of a curve of the average refracting power of surface refracting power from the center of said farsight portion to said farsight eye point position along said principal meridional curve.

6. A progressive multifocal lens according to claim 1, wherein average refracting power of surface refracting power along said principal meridional curve is gradually increased from a center of said farsight portion to a farsight eye point position and connected to an additional power curve of said intermediate portion continuously and smoothly.

7. A progressive multifocal lens according to claim 6, wherein from the center of said farsight portion to said farsight eye point position, the following conditions are satisfied:

$$0.025\ A \leqq \Delta D \leqq 0.25\ A$$

$$0.0025\ A \leqq Dk \leqq 0.025\ A,$$

wherein

ΔD: a change amount (diopter) of the average refracting power of surface refracting power from the center of said farsight portion to said farsight eye point position along the principal meridional curve A: an additional power (diopter)

Dk: a gradient (diopter/mm) of a curve of the average refracting power of surface refracting power from the center of said farsight portion to said farsight eye point position along said principal meridional curve.

* * * * *